United States Patent [19]

Coingt

[11] Patent Number: 4,508,696

[45] Date of Patent: Apr. 2, 1985

[54] CYCLIC PROCESS FOR THE PRODUCTION OF HYDROGEN PEROXIDE

[75] Inventor: Michel Coingt, Lyons, France

[73] Assignee: Produits Chimiques Ugine Kuhlmann, Paris, France

[21] Appl. No.: 654,040

[22] Filed: Sep. 21, 1984

Related U.S. Application Data

[63] Continuation of Ser. No. 526,206, Aug. 26, 1983, abandoned, which is a continuation of Ser. No. 361,585, Mar. 24, 1982, abandoned.

[30] Foreign Application Priority Data

Apr. 7, 1981 [FR] France ............... 81 06923

[51] Int. Cl.$^3$ ............................................. C01B 15/02
[52] U.S. Cl. ............................................. 423/588
[58] Field of Search .................... 423/588, 589

[56] References Cited

U.S. PATENT DOCUMENTS

| | | | |
|---|---|---|---|
| 3,408,163 | 10/1968 | Franchuk et al. | 423/588 |
| 3,540,847 | 11/1970 | Logan | 423/589 |
| 3,767,779 | 10/1973 | Coingt | 423/588 |
| 3,838,178 | 9/1974 | Vaughan | 423/588 |

FOREIGN PATENT DOCUMENTS

| | | | |
|---|---|---|---|
| 672419 | 5/1966 | Belgium | 423/589 |
| 614296 | 2/1961 | Canada | 423/590 |
| 838939 | 6/1960 | United Kingdom | 423/588 |

*Primary Examiner*—John Doll
*Assistant Examiner*—Wayne A. Langel
*Attorney, Agent, or Firm*—Brooks Haidt Haffner & Delahunty

[57] ABSTRACT

Improved recycle processes for preparing hydrogen peroxide to hydrogenating alkylanthraquinone in a solvent to form hydrogenated alkylanthraquinone, treating the resulting liquid with an oxygen-containing gas to form hydrogen peroxide and regenerate the quinone, extracting the hydrogen peroxide with water, and recycling the quinone, wherein the quinones are 2-ethylanthraquinone (EAQ) and 2-ethyl-5,6,7,8-tetrahydroanthraquinone (H$_4$EAQ) and losses of quinone are made up exclusively with H$_4$EAQ, the solvent being methylcyclohexyl acetate and a nine carbon-atom alkylbenzene, these processes providing reduced losses of the active intermediate and improved operation of the hydrogen peroxide production unit.

3 Claims, No Drawings

CYCLIC PROCESS FOR THE PRODUCTION OF HYDROGEN PEROXIDE

This application is a continuation of application Ser. No. 526,206 filed Aug. 26, 1983, now abandoned which is a continuation of application Ser. No. 361,585, filed Mar. 24, 1982 now abandoned.

BACKGROUND OF THE INVENTION

This invention relates to processes for producing hydrogen peroxide, and more particularly to improvements in the cyclic process for the production of hydrogen peroxide.

Conventional cyclic processes for the production of hydrogen peroxide involve hydrogenating one or more alkylanthraquinones dissolved in a water-immiscible solvent, so as to convert them into alkylhydroanthraquinones; subsequently treating the reaction medium with a gas containing oxygen so as to form hydrogen peroxide while regenerating the starting alkylanthraquinones; and finally extracting the hydrogen peroxide from the solution of quinones using water, before recycling the solution of quinones into the hydrogenation step.

In descriptions of processes of this kind, the term "anthraquinones" is generally used to mean so-called "true" anthraquinones with aliphatic substituents, and hydroanthraquinones, such as the tetrahydrogenated derivatives of these anthraquinones.

In these recycling processes, it is well known that, if the active intermediates have been introduced into the reaction cycle in the form of a true anthraquinone, the latter is progressively converted into the tetrahydrogenated form in the course of the successive operation of recycling of the solution.

The proportion of the tetrahydrogenated form reached is variable and depends on the working conditions at every stage of the manufacturing process.

It is also known, in fact, that other undesirable reactions convert the active intermediates into inactive products, some of which can be reconverted into active intermediate. This reconversion can be effected by various processes within the cycle or outside it.

It should be noted that these processes are themselves liable to affect the proportion of tetrahydroanthraquinone, and therefore the proportion of true anthraquinones and the tetrahydrogenated derivatives thereof depends on all the process conditions.

In Oxysynthese French Pat. No. 1,498,406 relating to a process similar to that described above, a mixture of anthraquinones containing 2-ethylanthraquinone and 2-ethyl-5,6,7,8-tetrahydroanthraquinone, referred to herein as "EAQ" and "H$_4$EAQ", respectively, is used. In the French patent the working conditions are adjusted so that the proportion of H$_4$EAQ is about 90% of the mixture of the two anthraquinones. The conversion rate on hydrogenation is approximately 90%, and the solution contains a substantial proportion of inactive products, which are derived from the two anthraquinones used. This proportion, which is preferably greater than 150 g/L, makes it possible to achieve productivity levels exceeding 13 g of H$_2$O$_2$/L.

The presence of these inactive products increases the solubility of the anthraquinones and hydroanthraquinones and consequently the equivalent concentration of hydrogen peroxide in the solution. However, although these products play a useful part, an accumulation of them beyond the selected limit constitutes a loss of the active intermediate, thus involving some considerable expense.

THE INVENTION

The present invention accordingly provides improvements in the prior art processes for the recycle method of producing hydrogen peroxide, as exemplified by the foregoing French patent, by reducing losses of the active intermediate and improves the operating conditions of such processes, as more fully described hereafter. The improved results according to the present invention are obtained by the introduction in successive cycles of the hydrogen peroxide-forming reaction solely of 2-ethyl-5,6,7,8-tetrahydroanthraquinone as the make-up quinone to compensate for the loss of active material.

Briefly, the present invention relates to a cyclic process for the production of hydrogen peroxide using an active intermediate containing EAQ and H$_4$EAQ, mixed with various inactive products resulting from the conversion of the active intermediates, the whole being dissolved in a solvent consisting of methylcyclohexyl acetate and a benzene hydrocarbon with nine carbon atoms, wherein the conversion rate of the mixture of quinones is above 80%, the process being characterized in that, to compensate for the disappearance of active intermediate, the latter is introduced in the form of H$_4$EAQ and exclusively in this form.

As shown by the Examples which follow, the addition of H$_4$EAQ instead of EAQ according to this invention has considerable advantages:

1. With an equally high production of hydrogen peroxide, there is less degradation of the mixture of quinones and consequently a saving in the quinone consumption.

2. A smaller quantity of catalyst is used, resulting in a saving in re-processing of the catalyst.

3. There is a greater uniformity of operation of the hydrogen peroxide production unit, leading to a certain number of operational savings.

These advantages were not foreseeable and are surprising in view of the prior knowledge.

As for the first advantage, it should be noted that the concentrations of the two forms EAQ and H$_4$EAQ are, on balance, not very different if H$_4$EAQ or EAQ is introduced into the system. From this, it follows that the same reactions of degradation should occur substantially at the same speeds. In fact, this is not the case, and it is found that the saving in quinone may be nearly 40 percent within the scope of the invention, as is shown by the Examples.

The second advantage could result from the known tendency of H$_4$EAQ to be reduced to form hydroquinone at a speed greater than the speed of reduction of EAQ. Here again, the slight difference in composition contradicts this argument and it is found, in practice, that the saving in catalyst is particularly noticeable during the periods after the additions of H$_4$EAQ. All in all, a reduction in consumption of up to 30% is observed.

The third advantage results from the greater stability of the concentrations of quinones and is a consequence of the first two advantages.

Thus, the method according to the invention makes it possible to maintain a high conversion rate for the anthraquinones under much more economical conditions than when EAQ is added.

All parts, percentages, proportions and ratios herein are by weight, unless otherwise stated.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

After being used for several years to produce $H_2O_2$, a working solution contains 80 g/L of $H_4EAQ$, 10 g/L of EAQ and 160 g/L of the degradation product of these two anthraquinones.

Two equal fractions of this solution are placed in two identical units for the production of hydrogen peroxide, these units being designated "A" and "B".

The working conditions are identical:

Temperature, t°, of hydrogenation and oxidation: 65° C.

Temperature, t°, of extraction: 25° C.

Hydrogenation catalyst: palladium deposited on sodium silico-aluminate, in an amount of 2 percent of metal.

Conversion of the anthraquinones into hydroanthraquinones: 86 percent on average.

A reconversion stage, consisting of a column containing a sodium hydroaluminum silicate, is inserted in the path taken by the solution after $H_2O_2$ extraction and prior to the hydrogenation. The only difference in operation between Units "A" and "B" is that, in order to maintain the anthranquinone content at 90 g/L, whenever the level is equal to or less than 87 g/L, quantities of the order of 5 to 10 g/L of $H_4EAQ$ are added to Unit "A" and of EAQ are added to Unit "B".

After one month of continuous operation, the following differences are observed:

| Unit | A | B |
|---|---|---|
| Average content of $H_4EAQ$, g/L | 82 | 78 |
| Average content of EAQ, g/L | 8 | 12 |
| Productivity of catalyst ($H_2O_2$/catalyst), % B | 125 | 100 |
| Average speed of accumulation of degradation products in g/L/day | 0.6 | 0.8 |

It will be seen that, under the working conditions used, including those of the reconversion, the use of the $H_4EAQ$ in Unit "A" instead of the EAQ in Unit "B" reduces the consumption of anthraquinone by 25% and the catalyst consumption by 20%.

EXAMPLE II

The same procedure is followed as in Example I, starting with the same working solution and under the same operating conditions, except that there is no reconversion station either in Unit "A" or "B".

After one month's operation, the following differences are observed:

| Unit | A | B |
|---|---|---|
| Productivity of catalyst ($H_2O_2$/catalyst), percent B | 129 | 100 |
| Average speed of accumulation of degradation products in g/L/day | 2.6 | 4.2 |

It will be seen that, without a reconversion stage, the use of $H_4EAQ$ instead of EAQ reduces the anthraquinone consumption by 38% and the catalyst consumption by 22.5%.

What is claimed is:

1. In a recycle process for the production of hydrogen peroxide wherein at least one alkylanthraquinone is hyrogenated in a water-immiscible vehicle to convert the alkylanthraquinone to alkylhydroanthraquinone, the resulting liquid is treated with an oxygen-containing gas to form hydrogen peroxide and regenerate the starting alkylanthraquinone, the hydrogen peroxide so formed is extracted with water from the vehicle, and the quinones are recycled to the hydrogenation with a loss of quinone occurring during the process, the improvement comprising using a mixture of 2-ethylanthraquinone and 2-ethyl-5,6,7,8-tetrahydroanthraquinone as the quinones and introducing 2-ethyl-5,6,7,8-tetrahydroanthraquinone as the sole quinone to replace lost quinone, the proportion of the tetrahydroanthraquinone being about 90 percent of the two quinones and the quinone degradation product content of the liquid being greater than 150 g/L.

2. A process according to claim 1 wherein the vehicle is a mixture of methylcyclohexyl acetate and nine carbon-atom alkylbenzene.

3. A process according to claim 1 wherein the conversion rate of 2-ethylanthraquinone to 2-ethyl-5,6,7,8-tetrahydroanthraquinone is greater than 80 percent.

* * * * *